(12) United States Patent
Sønsterød

(10) Patent No.: US 8,120,472 B2
(45) Date of Patent: Feb. 21, 2012

(54) CAR SECURITY ALARM DEVICE

(75) Inventor: Tor Sønsterød, Heggedal (NO)

(73) Assignee: IDTEQ AS, Asker (NO)

( * ) Notice: Subject to any disclaimer, the term of this patent is extended or adjusted under 35 U.S.C. 154(b) by 403 days.

(21) Appl. No.: 12/309,068

(22) PCT Filed: Jul. 9, 2007

(86) PCT No.: PCT/NO2007/000265
§ 371 (c)(1),
(2), (4) Date: Apr. 16, 2009

(87) PCT Pub. No.: WO2008/007972
PCT Pub. Date: Jan. 17, 2008

(65) Prior Publication Data
US 2009/0289782 A1    Nov. 26, 2009

(30) Foreign Application Priority Data

Jul. 10, 2006  (NO) .................................. 20063199

(51) Int. Cl.
*B60R 25/10* (2006.01)

(52) U.S. Cl. ..................... 340/426.1; 340/429; 340/540; 340/541

(58) Field of Classification Search ............. 340/540, 340/541, 545.1, 565, 566, 573.1, 573.4, 426.1, 340/426.24, 426.26, 426.27, 429
See application file for complete search history.

(56) References Cited

U.S. PATENT DOCUMENTS

| | | | |
|---|---|---|---|
| 3,864,675 A | | 2/1975 | Colibert |
| 4,155,067 A | | 5/1979 | Gleeson |
| 4,187,497 A | | 2/1980 | Howell et al. |
| 4,849,947 A | * | 7/1989 | Baule et al. .................. 367/178 |
| 5,376,919 A | * | 12/1994 | Rickman ...................... 340/544 |
| 5,463,371 A | | 10/1995 | Fuller |
| 5,625,348 A | * | 4/1997 | Farnsworth et al. .......... 340/690 |
| 6,331,816 B1 | * | 12/2001 | Myllymaki ................... 340/540 |
| 6,370,481 B1 | * | 4/2002 | Gamble ......................... 702/56 |
| 6,570,500 B1 | * | 5/2003 | Pieper .......................... 340/541 |

OTHER PUBLICATIONS

International Search Report mailed Nov. 14, 2007 for International Application No. PCT/NO2007/000265.

* cited by examiner

*Primary Examiner* — Anh V La
(74) *Attorney, Agent, or Firm* — Wenderoth, Lind & Ponack, L.L.P.

(57) ABSTRACT

A portable alarm device (100) for guarding a car (200) or another mobile object having a lockable compartment against theft or burglary, comprising: a housing (1) having at least one opening (2) and a microphone (4) therein for detecting infrasound; electrical circuitry (5) within housing (1) for processing signals and for transmitting an alarm signal on the detection of a forced entry; and a built-in power supply (7), i.e. batteries. The housing (1) is provided with steering features (2,9,11) for ensuring the existence of an unobstructed air path to opening(s) (2) regardless of the orientation and position assumed by the alarm device (100) being put rapidly into the coupe of the car by a staff member. The steering features may be legs (9) proximate to opening (2), a grating (10) surrounding opening (2), or alternatively surrounding the entire housing (1), or may be comprised of a number of openings in housing (1), spaced around the housing.

29 Claims, 5 Drawing Sheets

Side view of alarm device

Side view of alarm device

Bottom view of alarm device

Alarm device comprising a grating

FIG. 5
Perspective view of alarm device
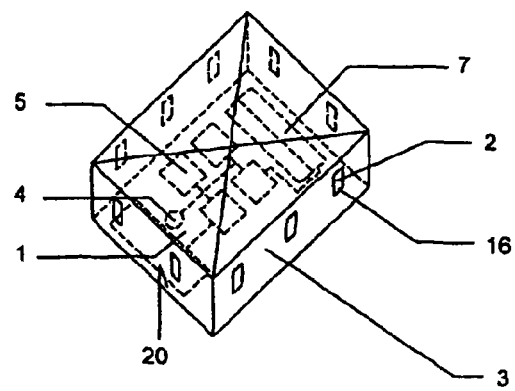
FIG. 6
Alarm embedded in ball lattice
FIG. 7
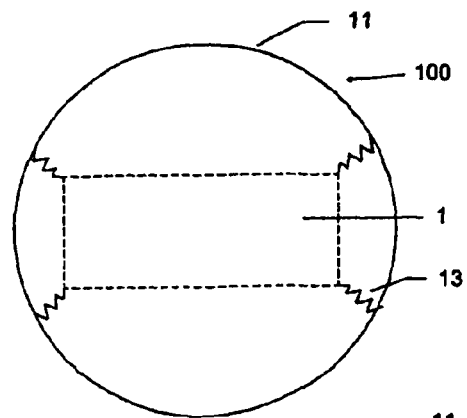
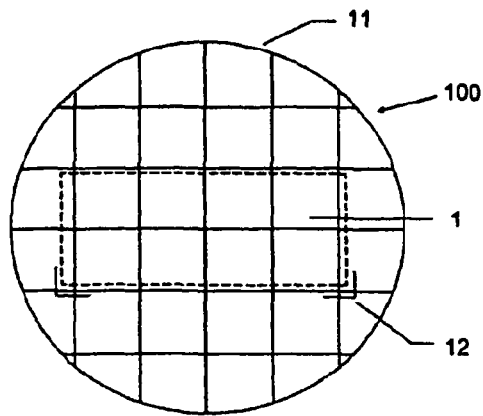
FIG. 8
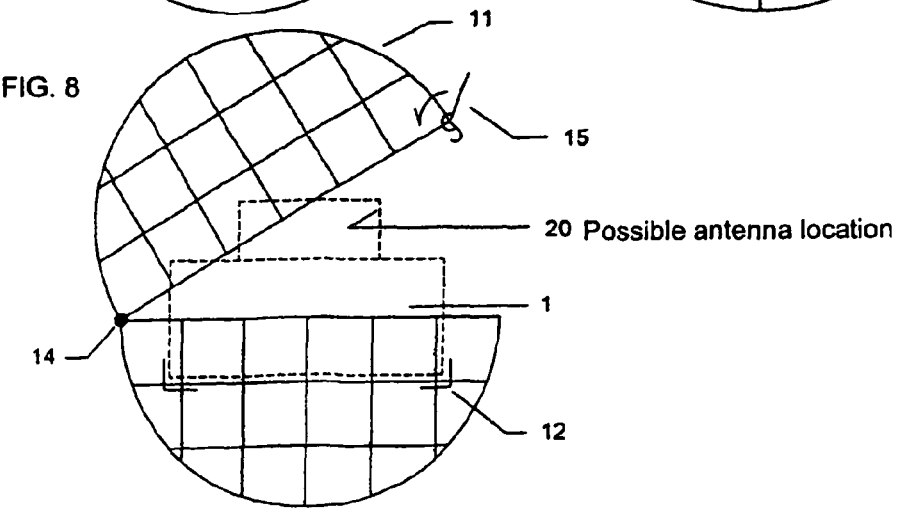
20 Possible antenna location Alarm device being put into vehicle

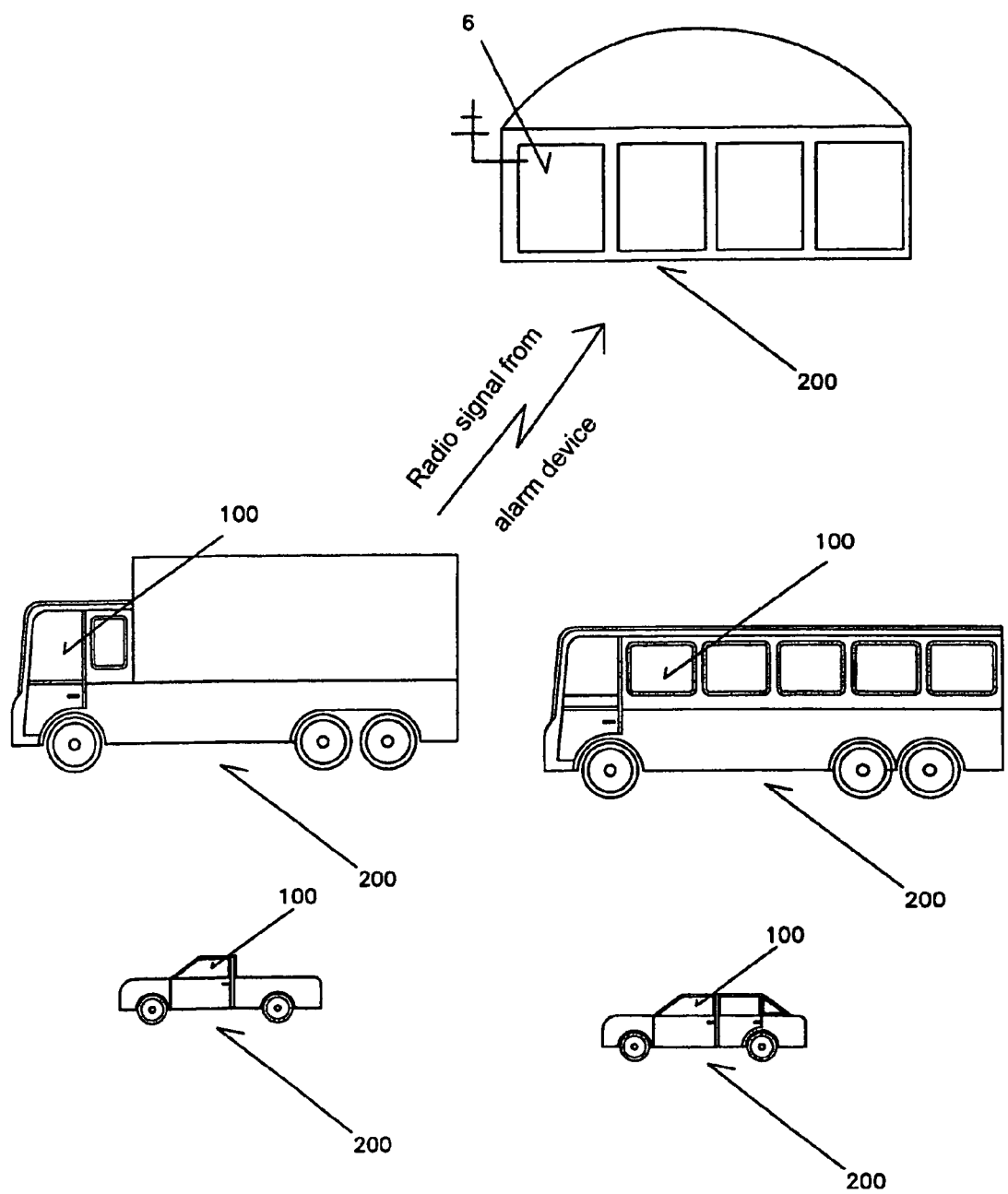

CAR SECURITY ALARM DEVICE

FIELD OF THE INVENTION

The present invention relates to an alarm device for protecting a car against burglary and theft. The invention is particularly useful in connection with cars being temporarily located in certain parking areas, such as auto dealer/repair shops, short- and long-term car parks, company car parking areas of larger companies, etc.

The alarm device of the present invention may also be used for securing e.g. containers/workmen's huts, etc. being temporarily disposed/parked in connection with either freight or storage. Similarly, airplanes, choppers, and boats being temporarily located at suitable sites (airport areas, hangars, marinas, ports) may also be secured using the alarm device of the invention.

BACKGROUND OF THE INVENTION

There is a need for being able to temporarily provide an individual car with reliable warning/protection equipment communicating by way of a radio connection with a nearby alarm central. Typically, this is of interest in a scenario in which a number of cars, for example, have arrived during the day, while in the same period perhaps roughly the same number of cars have been removed. The object then is to distribute and place an alarm device onto or into each individual car in a simple manner that minimizes the effort for an employee at the site. If each alarm unit needs to be positioned accurately and configured correctly for the alarm to function properly, a lot of time will be spent in carrying out this task, hence making the use of the alarm systems prohibitively time-consuming.

Alarm devices for the temporary protection of cars as indicated above are previously known, for example, from U.S. Pat. No. 3,864,675, U.S. Pat. No. 4,155,067, U.S. Pat. No. 4,187,497, and U.S. Pat. No. 5,463,371. In U.S. Pat. No. 3,864,675, an alarm device is disclosed that needs to be hanged inside the car in a vertical position and that responds to movements/vibration of the car body. U.S. Pat. No. 4,155,067, U.S. Pat. No. 4,187,497, and U.S. Pat. No. 5,463,371 also disclose alarm devices responding to movements/vibration, which are carefully positioned using a hanger means suspended from the top of one of the windows of the car.

Thus, it appears that the site personnel have to spend a lot of time positioning and adjusting the alarm device appropriately for each individual car so that it will be able to cooperate properly with the monitoring central. This is a consequence, inter alia, of the type of detection principle being used.

Ideally, an employee should only have to open a car door, then put or even toss the alarm device into the car seat without any concern for its position or orientation, and thereafter just close and lock the door. Alternatively, the employee could hide the alarm device under the seat or in the trunk, for example. The object of the present invention is to provide an alarm device that following such a simple deployment is still able to function 100% reliably.

Hence, an important part of the present invention is that the detection principle being used works omnidirectionally, meaning that the detector receives external signals from all directions. Another important part is to avoid blocking of the path for the external signal towards the detector, regardless of how the alarm device is positioned within the car.

Thus, according to the present invention, a portable alarm device for protecting a car against theft or burglary is provided, the alarm device comprising

- a housing having at least one opening through at least one of the housing walls for providing an air flow path to a microphone located within the housing, the microphone being adapted for detecting infrasound signals within the frequency range of 0.1-15 Hz,
- electrical circuitry within the housing for processing signals received from the microphone and transmitting an alarm signal on the automatic determination that a detected event is abnormal, and
- a power supply embedded in the housing.

In particular, the alarm device according to the invention is characterized in that the housing is provided with steering features for ensuring the existence of an unobstructed air flow path to the at least one opening regardless of the orientation assumed by the alarm device when put in by the employee to rest on one of the available support surfaces within the coupé of the car, e.g. a seat, floor, or trunk.

According to a first embodiment, said steering features are comprised of at least one projection or leg on the housing in the vicinity of the microphone opening.

According to an alternative embodiment, the steering features may consist of a netting or grating secured to the housing and spaced at a certain distance from the housing surrounding the opening. In this case, the netting may enclose the entire housing like a ball or an egg, and the netting/grating may be secured to the housing at the housing corners, or be secured to the housing by way of short struts. Preferably, the struts are flexible in order to provide a shock dampening function. Moreover, it would be advantageous if the netting/grating were split through a hinge and locking arrangement to provide easy access to the housing. The netting/grating is preferably made of a strong plastic material.

According to a further embodiment, the steering features may be comprised of a number of openings in the form of perforations in the housing wall(s) formed in the housing wall(s) in areas ensuring that at least one of the perforations points upwards/outwards regardless of the orientation of the alarm device. The perforations may advantageously be distributed throughout the entire outer surface of the housing.

In some embodiments it will be advantageous to have a soft outer casing surrounding the housing, preferably of a soft rubber material, for mechanical shock absorption.

Also, it is advantageous if the at least one opening in the housing wall is covered by a membrane preventing the intrusion of dust while allowing infrasound signals to pass.

In an embodiment wherein the electrical circuitry is connected to an acoustic alarm signaller, the alarm signal emitted may be an audio signal.

In another embodiment, the electrical circuitry is connected to a radio antenna for transmitting a radio signal to an external alarm central.

BRIEF DESCRIPTION OF THE DRAWINGS

In the following, the invention will be illustrated in greater detail in connection with a few preferred embodiments, and with reference to the accompanying drawings, in which:

FIG. 5 shows a third preferred embodiment of the alarm device according to the invention, FIG. 6 schematically shows a forth preferred embodiment of the alarm device according to the invention, FIG. 7 shows a variant of the embodiment of FIG. 6, FIG. 8 shows an additional advantageous detail of the embodiments of FIGS. 6 and 7, FIGS. 9 and 10 show the deployment of the alarm device according to the invention into a vehicle, and FIG. 11 illustrates the transmission of a radio signal from the alarm device according to the invention to an external alarm central.

DETAILED DESCRIPTION OF THE INVENTION

Figure 1:
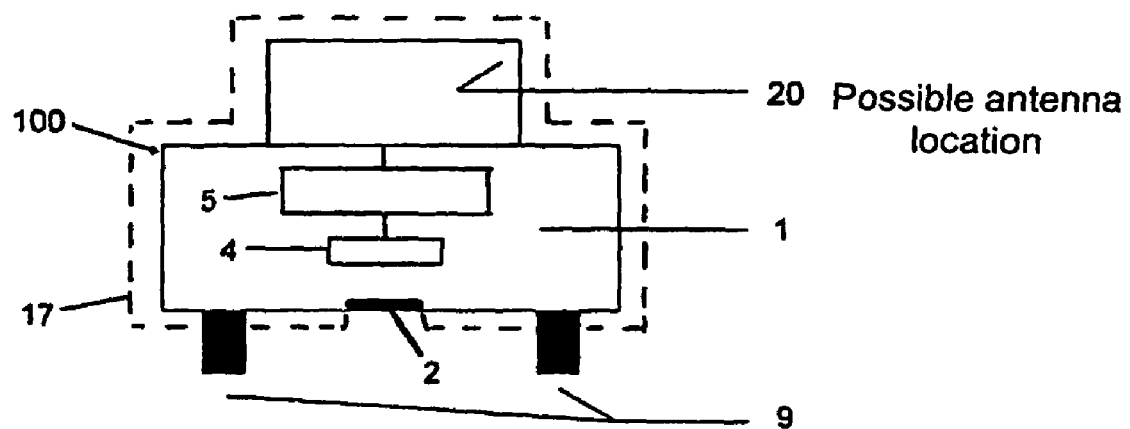
FIG. 1 shows a first preferred embodiment of an alarm device according to the present invention.

As mentioned introductorily, the object of the present invention is to provide an alarm device that may be deployed with great ease anywhere within the coupé of a car (the use of the term car is also meant to include a bus, van, trailer, truck, tractor, recreational vehicle, caravan, construction machine, as well as any other vehicle having a lockable coupé. Moreover, as stated above, the alarm device may also be used for temporarily parked containers and workmen's huts). It is assumed that an employee at a site at which a number of cars are parked may carry with him a necessary number of such alarm devices, unlock the door of a given car, and relatively quickly and recklessly put or even toss the alarm device into a seat of the car, a floor of the car, the car trunk, or in the rear compartment in the case of a station wagon, for example. Such an operation may then be completed within a few seconds, of which most of the time is actually spent on unlocking the car door and subsequently locking it. (If desired, the alarm device may be placed in such a manner that it cannot be seen from the outside.)

In order for such a rather reckless deployment of the alarm device to still result in an adequate detection function, a detection principle is chosen that is based on the detection of infrasound waves (also sometimes referred to as "volumetric signals" by those skilled in the art). Such very low frequency pressure waves propagate through the air and are typically initiated by the movement of an air mass induced by a moving object. Exemplary moving objects are windows and doors that are opened/closed, windows that are crushed, or even a bending wall, floor, or roof. Thus, infrasound contains a lot of information regarding relevant events associated with human activity such as burglary and the low frequency signals tend to spread out in the surroundings in a uniform manner. Hence, an infrasound detector will, in principle, be omnidirectional, i.e. it will detect signals from all directions.

The present invention is not directed to the processing of the detected signals. For a description of such processing, it is referred to the previous Norwegian Patent Application no. 2005 2403, submitted May 18, 2005, of which the inventor of the present invention is listed is a co-inventor. Thus, in the preferred embodiment of the invention, signal processing means are used that operates according to the principles disclosed in the above referenced patent application to automatically make decisions as to whether or not a burglary is in progress.

The present invention, however, is related to the physical design of the alarm device, particularly designed for random handling on deployment in the coupé of a car, as indicated above. The goal is that the alarm device shall function equally well regardless of how it ends up in the coupé of the car, with respect to both position and orientation.

It is therefore important that there exists, at all times, an air path into a microphone embedded in the alarm device of the invention. Unless certain measures are taken, an alarm device that is not designed in accordance with the present invention may easily end up in a position in which there does not exist any unobstructed air path into the sensor/microphone that is supposed to receive the signals, and, additionally, an unfavourable position within the car coupé, e.g. on a floor far down in the coupé, will result in a weak reception of common sound frequencies. Said infrasound frequencies, however, may work well anywhere in the car's coupé.

Accordingly, the invention is based on two important principles, namely the use of infrasound/volumetric signals rendering the position within the car unessential (the term coupé is meant to include both the coupé and trunk of a car) and special so-called steering features on the alarm device itself, ensuring the existence of an unobstructed air path towards the microphone for the reception of infrasound at all times.

Reference is now made to FIG. 1, which schematically shows an alarm device generally referred to as 100. The alarm device comprises an outer casing in the form of a housing 1, which in this particular example is a parallelepiped box. As such, there are no limitations on the geometric shape of the box. The box could also have curved walls, or a larger number of walls/sides/corners. However, some kind of opening 2 has to exist that provides an unobstructed air path into an important element, namely a sound/vibration sensor, or microphone, 4, as shown schematically in the figure. Microphone 4 is connected to signal processing circuitry 5, which will not be discussed in more detail in the present invention. The signal processing circuitry is capable of deciding whether or not an abnormal situation exist, i.e. a burglary, in a given case, and if so a radio signal, for example, may be emitted by way of an associated antenna 20, which is also shown schematically on the outside of housing 1.

For the invention, the important element of FIG. 1 is the projections or legs 9, which ensure that there will always exist an unobstructed air space into opening 2, even if opening 2 has ended up facing down against a car seat or against a floor in the coupé of the car. In the absence of such legs 9, opening 2 could very well end up against some supporting surface, so that no free air path would exist into opening 2 and thus microphone 4.

Figure 2:
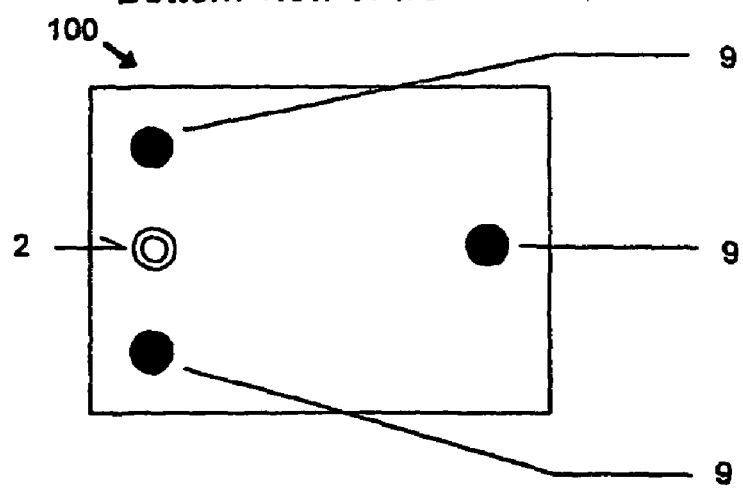
FIG. 2 shows the alarm device of FIG. 1, but in a bottom view.

FIG. 2 shows the alarm device of FIG. 1, but in a bottom view. In the embodiment shown, it can be seen that alarm device 100 is provided with three legs 9, even though only two such legs would suffice in practice. Actually, with a proper length leg, one leg 9 would be sufficient, that is, assuming that it is located in the vicinity of the opening 2. The alarm device would then assume a "tilted" position, but still provide an unobstructed air path into opening 2 and microphone 4.

Figure 3:
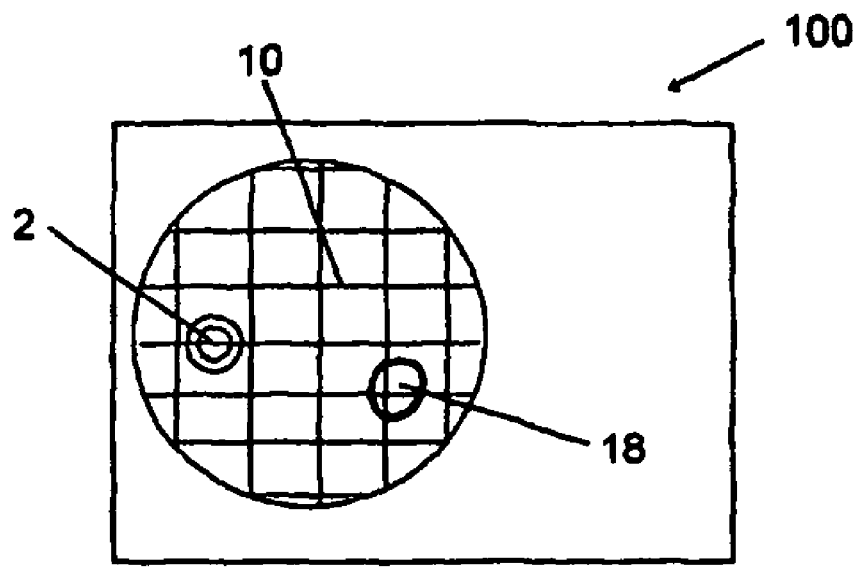
FIG. 3 shows a second preferred embodiment of the alarm device according to the invention.
Figure 4:
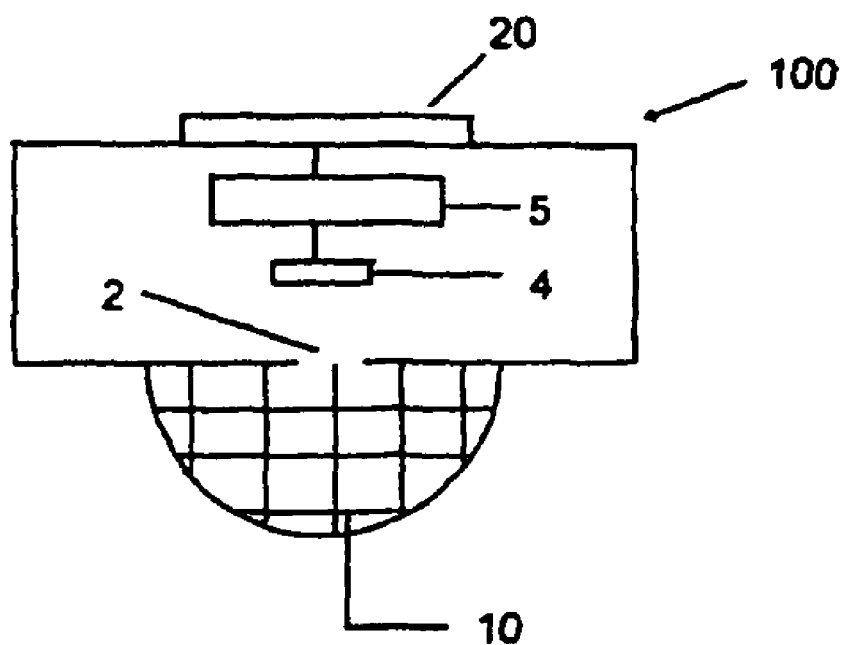
FIG. 4 is similar to FIG. 3, but viewed from a different angle.

FIG. 3 shows an alternative solution that will also ensure the existence of an unobstructed air path into opening 2. In principle, the alarm device 100 is similar to the one shown in FIGS. 1 and 2, with the exception that legs 9 are now replaced with a grating 10, which in the example shown is hemispherical in shape and surrounds opening 2. This represents another way of ensuring the existence of the required free air path into opening 2. The remaining elements appearing in FIG. 3, as well as in FIG. 4 showing the same device as FIG. 3, are the same as those shown in FIGS. 1 and 2. It is understood that such a grating, which could also have a different shape from that shown, will ensure that there will always exist an unobstructed air path into opening 2 and microphone 4.

FIG. 3 also shows an acoustic alarm signal transmitter 18 for an embodiment emitting an audio signal in the case of a burglary. An alarm device may very well include both such an acoustic signal transmitter as well as a radio signal antenna as shown above. It will be possible to selectively configure such functions.

It can be noted that should the alarm device 100 end up upside-down as compared to the position shown in FIGS. 4 and 1, i.e. with the radio antenna located on the "underside", this is not a big problem as the radio signal being emitted is only to propagate a relatively short distance from the car to a nearby alarm central. It is no problem to provide sufficient signal power for the radio signal to easily reach a few hundred meters away from the car triggering the alarm, even with a downwardly facing antenna and with the alarm device located at the bottom of the car. In other words, the propagation of a radio signal will not present any problems in this respect.

FIG. 5 also shows a parallelepiped box, i.e. a housing 1, containing the other necessary elements. However, FIG. 5 features a third embodiment of the above-mentioned "steering features" provided for ensuring the existence of an unobstructed air path regardless of the position and orientation of the alarm device in operation. In this case multiple openings 2 are provided through walls 3 of housing 1, as opposed to a single opening as in the above embodiments. Consequently, we use the term "perforations", and, again, note that several holes are provided in the walls 3, so that regardless of the orientation of the alarm device on a seat or floor within the coupé of the car, a number of holes will be facing outwardly or upwardly. In the embodiment shown, holes are provided in four of the side faces 3 of the parallelepiped box, even though additional holes could also be provided in the remaining two, largest, faces.

Further details set out in this drawing are a microphone 4, signal processing circuitry 5, power supply 7 (preferably constituted by electrical batteries), internally or externally mounted transmitter/antenna 20, as well as an outlined membrane 16 covering each opening/perforation 2. The purpose of membrane 16 is to prevent dust from entering into the alarm device while infrasound/volumetric signals are let through without being dampened. In the example shown, one such membrane may be provided for each opening, or a band extending across the entire inner circumference may be used. Such a membrane 16 may advantageously be made of an elastic material like rubber or a similar material, but this is not a requirement.

The main point is that the membrane prevents the intrusion of dust while transmitting movement/vibration of the air mass.

In FIGS. 6, 7, and 8, another embodiment is shown that will ensure the existence of an unobstructed air path into an opening 2 in a housing 1 of the type shown in FIGS. 1 and 2, for example, but having no projections or legs. In this case the entire housing 1 is accommodated within a grating shaped like a ball or an egg, and the housing, which could equally well be of another shape than a parallelepiped box, is fixed to the grating ball either by struts 13, or in such a manner that the housing corners are connected directly to the grating. The first variant is shown in FIG. 6, whereas the variant in which the corners 12 are fixed to the grating is shown in FIG. 7. The reference number 11 refers to the totally enclosing grating/netting of FIGS. 6, 7, and 8. FIG. 8 shows an essential detail, namely an opening and closing mechanism constituted by a hinge 14 and locking means 15 to allow access into the inside housing 1.

Moreover, it is also possible to provide means reducing the effect of any mechanical shock to which the alarm device might be subject being put rather quickly or even tossed into a car. Such a provision is shown in FIG. 6 in the form of a flexible suspension comprising spring struts 13.

Another way of providing shock absorption is to provide a soft outer casing surrounding the entire housing, with such an outer casing 17 being indicated by dashed lines in FIG. 1. Such casing preferably comprises a soft rubber material, foam rubber, or the like. Obviously, the soft material 17 must not cover opening 2.

Figure 9:
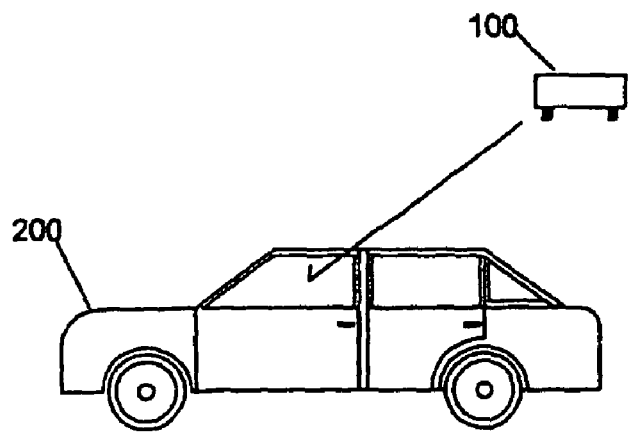
Figure 10:
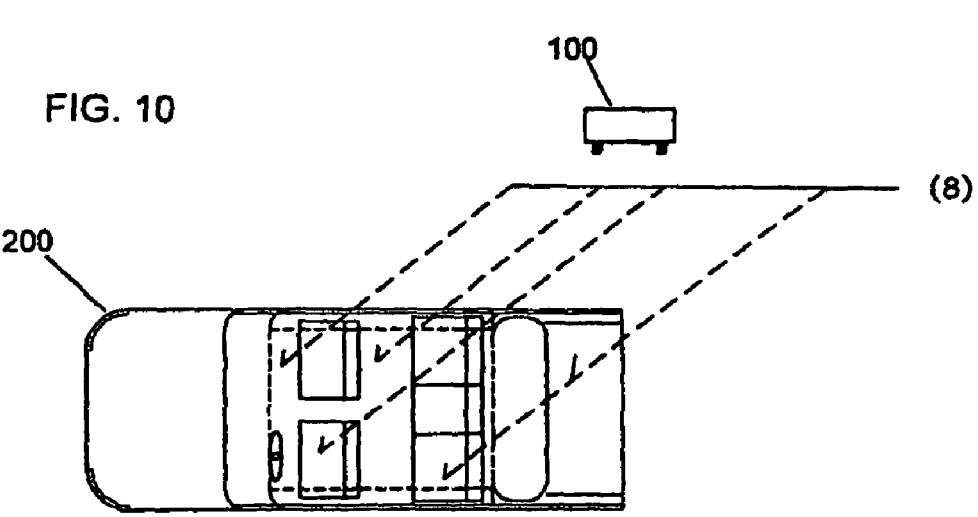

FIGS. 9 and 10 schematically outline the placement of the alarm device of the invention in a car. The alarm device 100, being of an embodiment corresponding to the one shown in FIG. 1, is to be deployed into a car 200. As appears from FIG. 10, any supporting surface within the car may be used, i.e. the alarm may be put in a front or rear seat, on any floor, or alternatively in a rear compartment of the coupé or in the trunk. When positioned in the trunk, the alarm device will still cover the coupé, assuming that there is no physical seal between the coupé and trunk comprised of a non-transmitting material.

FIG. 11 outlines a parking area for cars 200 at which each car has been fitted with an individual alarm device 100. A radio signal may be emitted from one of the alarm devices into the surroundings, intended to reach an antenna connected to an external alarm central 6 at the site, e.g. in a guard building 300 (or in the case of "smaller" scenarios, to an alarm central in a nearby apartment/house). The use of an embedded cellular transmitter calling a target receiver by way of a public network is contemplated.

Preferably, microphone 4, which is used for the reception of the ultra low frequency sound signals, is of the Silicon Machined Diaphragm (SMD) or Back Electret Condenser (ECM) type. In the case of emitting radio signals from a housing located within a grating ball or egg, the grating should not be made of metal, as metal may impair the radio signals. A strong plastic material is preferred for the grating.

The use of a membrane 16 (see FIG. 5) to prevent the ingression of dust may also be adopted in the other embodiments, c.f. FIGS. 1-4 and FIGS. 6-8.

In the embodiment shown in FIGS. 7 and 8, i.e. wherein a housing is attached to the outer grating at its corners, advantageously mounting brackets fixed to the grating may be used, into which the housing is fitted.

Opening 2 into housing 1 may be constituted by an aperture or gap between two (or more) parts composing the housing. Frequently it will be practical to create a housing of multiple parts that is assembled together, in which case such a solution may be convenient.

Thus, through an alarm device according to the present invention, the following advantages are attained: Firstly, the alarm device detects incoming signals from all directions, i.e. provides omnidirectional detection. Further, no installation process needs to be carried out for each car. Furthermore, the alarm device may be moved from one car to another without any kind of adjustment or reconfiguration. Also, such an alarm device may be used as a sensor being part of some larger system. The alarm device contains its own batteries for power supply and is hence totally self-sufficient. The alarm device may be provided with dust protection as well as with mechanical shock absorption means. The alarm device may be put anywhere in the coupé or trunk of the car, with the above limitations, regardless of its final orientation. Irrespective of its location the alarm device will guard the entire coupé against burglary.

A further possible embodiment is based on the cardanic suspension of an inner housing inside a grating, for example, in order to ensure that a microphone opening will always face upwardly regardless of the final orientation of the alarm device as positioned in the coupé of the car. However, such a floating suspension (gimbal mount) within a cage will be an excessively complicated solution as the cage itself will provide a sufficient "steering feature", as set out in the embodiment of FIGS. 6, 7, and 8.

The invention claimed is:

1. A portable alarm device for protecting a car against theft or burglary,
   wherein the portable alarm device is adapted to be placed onto a surface, such that the portable alarm device functions properly regardless of an orientation of the portable alarm device on the surface,
   wherein the portable alarm device comprises:
      a housing having at least one opening in at least one of housing walls to provide an air path to one of a microphone and a sound vibration sensor located within the housing, the microphone and the sound vibration sensor detecting infrasound signals within a frequency range of 0.1-15 Hz;
      electrical circuitry disposed within the housing, the electrical circuitry processing signals from at least one of the microphone and the sound vibration sensor and emitting an alarm signal based on an automatic determination that a detected event is abnormal; and
      a power supply embedded in the housing, and
   wherein the housing includes means ensuring a distance between the at least one opening and a support surface of the car, so as to ensure a presence of an unobstructed air path into the at least one opening regardless of the orientation of the portable alarm device on the support surface when the housing is placed to rest onto the support surface within the car.

2. The portable alarm device according to claim 1, wherein the means included in the housing is constituted by at least one projection or leg located on the housing proximate to the at least one opening providing the air path to the one of the microphone and the sound vibration sensor.

3. The portable alarm device according to claim 1, wherein the means included in the housing is constituted by a netting or a grating fixed to the housing and spaced at a certain distance from the housing surrounding the at least one opening.

4. The portable alarm device according to claim 1, wherein the at least one opening in the at least one wall of the housing walls is covered by a membrane preventing dust from entering into the housing while allowing infrasound signals to pass.

5. The portable alarm device according to claim 1, wherein the electrical circuitry is connected to an acoustic alarm signal transmitter.

6. The portable alarm device according to claim 1, wherein the electrical circuitry is connected to a radio antenna transmitting radio signals to an external alarm central.

7. The portable alarm device according to claim 1, wherein the portable alarm device is for securing a mobile object in a group of objects comprising airplanes, choppers, boats, workmen's huts, containers, buses, trucks, tractors, caravan hangers, recreational vehicles, as well as various other objects having a lockable compartment or a lockable coup.

8. The portable alarm device according to claim 2, wherein the portable alarm device is for securing a mobile object in a group of objects comprising airplanes, choppers, boats, workmen's huts, containers, buses, trucks, tractors, caravan hangers, recreational vehicles, as well as various other objects having a lockable compartment or a lockable coup.

9. The portable alarm device according to claim 3, wherein the portable alarm device is for securing a mobile object in a group of objects comprising airplanes, choppers, boats, workmen's huts, containers, buses, trucks, tractors, caravan hangers, recreational vehicles, as well as various other objects having a lockable compartment or a lockable coup.

10. A portable alarm device, for protection against theft or burglary,
    wherein the portable alarm device is adapted to be placed onto a surface, such that the portable alarm device functions properly regardless of an orientation of the portable alarm device on the surface,
    wherein the portable alarm device comprises:
       a housing having at least one opening in at least one wall of housing walls to provide an air path to one of a microphone and a sound vibration sensor located within the housing, the microphone and the sound vibration sensor detecting infrasound signals within a frequency range of 0.1-15 Hz;
       electrical circuitry disposed within the housing, the electrical circuitry processing signals from at least one of the microphone and the sound vibration sensor and emitting an alarm signal based on an automatic determination that a detected event is abnormal; and
       a power supply embedded in the housing,
    wherein the housing includes a netting or a grating fixed to the housing,
    wherein the netting or the grating surrounds the entire housing in a spherical or oblong shape, and
    wherein the netting or the grating is fixed to corners of the housing or fixed to short struts of the housing.

11. The portable alarm device according to claim 10, wherein the short struts are flexible, so as to provide shock absorption.

12. The portable alarm device according to claim 10, wherein the netting or the grating is split and includes a hinge and locking means in the split, so as to provide easy access to the housing.

13. The portable alarm device according to claim 10, wherein the netting or the grating is made of a strong plastic material.

14. The portable alarm device according to claim 10, wherein the portable alarm device is for securing a mobile object in a group of objects comprising airplanes, choppers, boats, workmen's huts, containers, buses, trucks, tractors, caravan hangers, recreational vehicles, as well as various other objects having a lockable compartment or a lockable coup.

15. The portable alarm device according to claim 11, wherein the portable alarm device is for securing a mobile object in a group of objects comprising airplanes, choppers, boats, workmen's huts, containers, buses, trucks, tractors, caravan hangers, recreational vehicles, as well as various other objects having a lockable compartment or a lockable coup.

16. The portable alarm device according to claim 12, wherein the portable alarm device is for securing a mobile object in a group of objects comprising airplanes, choppers, boats, workmen's huts, containers, buses, trucks, tractors, caravan hangers, recreational vehicles, as well as various other objects having a lockable compartment or a lockable coup.

17. The portable alarm device according to claim 10, wherein the at least one opening in the at least one wall of the housing walls is covered by a membrane preventing dust from entering into the housing while allowing infrasound signals to pass.

18. The portable alarm device according to claim 10, wherein the electrical circuitry is connected to an acoustic alarm signal transmitter.

19. The portable alarm device according to claim 10, wherein the electrical circuitry is connected to a radio antenna transmitting radio signals to an external alarm central.

20. A portable alarm device, for protection against theft or burglary,
  wherein the portable alarm device is adapted to be placed onto a surface, such that the portable alarm device functions properly regardless of an orientation of the portable alarm device on the surface,
  wherein the portable alarm device comprises:
    a housing;
    electrical circuitry disposed within the housing, the electrical circuitry processing signals from at least one of a microphone and a sound vibration sensor located within the housing and emitting an alarm signal based on an automatic determination that a detected event is abnormal; and
    a power supply embedded in the housing,
  wherein the housing includes a number of openings as perforations in walls of the housing at locations ensuring that at least one perforation of the perforations is upwardly/outwardly facing regardless of the orientation of the portable alarm device during operation, so as to provide an air path to one of the microphone and the sound vibration sensor located within the housing, and
  wherein at least one of the microphone and the sound vibration sensor is adapted to detect sound signals.

21. The portable alarm device according to claim 20, wherein the perforations are distributed throughout an entire outer surface of the housing.

22. The portable alarm device according to claim 20, wherein at least one opening of the number of openings located in at least one wall of the housing walls is covered by a membrane preventing dust from entering into the housing while allowing sound signals to pass.

23. The portable alarm device according to claim 20, wherein the electrical circuitry is connected to an acoustic alarm signal transmitter.

24. The portable alarm device according to claim 20, wherein the electrical circuitry is connected to a radio antenna transmitting radio signals to an external alarm central.

25. A portable alarm device for projection against theft or burglary,
  wherein the portable alarm device is adapted to be placed onto a surface, such that the portable alarm device functions properly regardless of an orientation of the portable alarm device on the surface,
  wherein the portable alarm device comprises:
    a housing;
    electrical circuitry disposed within the housing, the electrical circuitry processing signals from at least one of a microphone and a sound vibration sensor located within the housing and emitting an alarm signal based on an automatic determination that a detected event is abnormal; and
    a power supply embedded in the housing, and
  wherein the housing includes a soft outer casing comprised of a soft rubber material, so as to protect against mechanical shock.

26. The portable alarm device according to claim 25, wherein at least one opening of openings located in the housing walls is covered by a membrane preventing dust from entering into the housing while allowing sound signals to pass.

27. The portable alarm device according to claim 25, wherein the electrical circuitry is connected to an acoustic alarm signal transmitter.

28. The portable alarm device according to claim 25, wherein the electrical circuitry is connected to a radio antenna transmitting radio signals to an external alarm central.

29. A portable alarm device, for protection against theft or burglary,
  wherein the portable alarm device is adapted to be placed onto a surface, such that the portable alarm device functions properly regardless of an orientation of the portable alarm device on the surface,
  wherein the portable alarm device comprises:
    a housing;
    electrical circuitry disposed within the housing, the electrical circuitry processing signals from at least one of a microphone and a sound vibration sensor located within the housing and emitting an alarm signal based on an automatic determination that a detected event is abnormal; and
    a power supply embedded in the housing, and
  wherein the housing is comprised of a number of joined parts, and the at least one opening is implemented as and within a joint, so as to appear as a gap between at least two joined parts of the number of joined parts.

* * * * *